(12) United States Patent
Ito

(10) Patent No.: US 9,078,522 B2
(45) Date of Patent: Jul. 14, 2015

(54) RECLINING DEVICE

(75) Inventor: Koji Ito, Fujisawa (JP)

(73) Assignee: SHIROKI CORPORATION, Fujisawa-Shi, Kanagawa (JP)

( * ) Notice: Subject to any disclaimer, the term of this patent is extended or adjusted under 35 U.S.C. 154(b) by 5 days.

(21) Appl. No.: 13/985,036

(22) PCT Filed: Jan. 25, 2012

(86) PCT No.: PCT/JP2012/051541
§ 371 (c)(1),
(2), (4) Date: Sep. 23, 2013

(87) PCT Pub. No.: WO2012/114814
PCT Pub. Date: Aug. 30, 2012

(65) Prior Publication Data
US 2014/0008958 A1    Jan. 9, 2014

(30) Foreign Application Priority Data
Feb. 24, 2011    (JP) .................. 2011-038086

(51) Int. Cl.
*B60N 2/235*    (2006.01)
*A47C 1/025*    (2006.01)
(52) U.S. Cl.
CPC .............. *A47C 1/025* (2013.01); *B60N 2/2356* (2013.01)
(58) Field of Classification Search
CPC ...................................................... B60N 2/2356

USPC ................................ 297/367 P, 367 L, 367 R
See application file for complete search history.

(56) References Cited

U.S. PATENT DOCUMENTS

| 6,843,533 B1 | 1/2005 | Miyata et al. |
| 8,827,368 B2 * | 9/2014 | Leighton et al. ........... 297/367 P |
| 2011/0012414 A1 | 1/2011 | Yamada et al. |
| 2011/0181088 A1 * | 7/2011 | Zhang et al. ................ 297/367 P |
| 2013/0161994 A1 * | 6/2013 | Ito ............................... 297/367 P |
| 2014/0001808 A1 * | 1/2014 | Ito ............................... 297/367 P |

FOREIGN PATENT DOCUMENTS

| JP | 3792942 B2 | 7/2006 |
| JP | 2009-118940 A | 6/2009 |
| JP | 2010-22401 A | 2/2010 |
| JP | 2010-35975 A | 2/2010 |
| WO | WO 2010/048383 A1 | 4/2010 |

* cited by examiner

*Primary Examiner* — Rodney B White
(74) *Attorney, Agent, or Firm* — McGinn IP Law Group, PLLC

(57) ABSTRACT

A reclining device includes a first member, a second member which is stacked at an open side of the first member, a pawl which is movably provided with the second member, a rotating cam which is provided to be rotatable about an axis of the relative rotation and includes a hook portion having a hook shape a guide which is formed with the second member and guides the pawl between a locked position and the unlocked position and a cam which is provided among the rotating cam, the pawl and the guide.

2 Claims, 8 Drawing Sheets

RECLINING DEVICE

TECHNICAL FIELD

The present invention relates to a reclining device that allows and restricts tilting of a seat back with respect to a seat cushion.

BACKGROUND

It will be described with reference FIGS. 6 to 8. FIG. 6 is a configuration view of a seat, FIG. 7 is an exploded perspective view showing a reclining device for a vehicle seat according to the prior art, and FIG. 8 is a configuration view explaining a locked state of the reclining device in FIG. 7.

As shown in FIG. 6, a seat 1 is configured by a seat cushion 2 that supports buttocks of a seated person, and a seat back 3 provided to be tiltable with respect to the seat cushion 2 in front and rear directions and to support a back of the seated person. A reference numeral 4 is a reclining device provided on a rotation axis for tilting of the seat back 3 to allow and restrict the tilting of the seat back 3.

Next, the reclining device 4 will be described with reference to FIGS. 7 and 8.

In these figures, the reclining device 4 includes a ratchet (first member) 7, in which internal teeth 7a are formed thereon along a circumferential direction of a circle about an axis of a relative rotation and one side is formed as an open side, and a base plate (second member) 5, which is stacked at the open side of the ratchet 7 and provided to be rotatable with respect to the ratchet 7 in the circumferential direction.

The base plate 5 is provided with two pawls 10 having an external tooth 10d to engage with the internal teeth 7a, respectively. The base plate 5 has a guide 5a and a guide 5b formed thereon to guide each pawl 10 in a radial direction with respect to the relative rotation. Therefore, each pawl 10 is movable in the radial direction with respect to the relative rotation.

On a surface opposite to a surface on which the external tooth 10d is formed of each pawl 10, a recess 10e is formed to extend in a direction intersecting with the radial direction with respect to the relative rotation.

A shaft 8 is rotatably provided along the axis of the relative rotation, and a rotating cam 9 including hook portions 9a having a hook shape is attached on the shaft 8 to be rotated together with the shaft 8. If the shaft 8 is rotated in one direction, each of the hook portions 9a of the rotating cam 9 presses the surface opposite to the surface on which the external tooth 10d is formed of each pawl 10, so that the pawl 10 is moved to a locked position where the external tooth 10d is engaged with the internal teeth 7a of the ratchet 7 (see FIG. 8). On the other hand, if the shaft 8 is rotated in the other direction, each of the hook portions 9a enters into the recess 10e of each pawl 10 and presses against an inner wall surface at a side of the rotation center of the relative rotation of the recess 10e, so that the pawl 10 is moved to an unlocked position where the external tooth 10d is disengaged from the internal teeth 7 of the first member 7.

Also, each pawl 10 is urged to be positioned at the locked position by a spiral spring 19, which has one end locked on the base plate 5 and the other end locked in a locking portion 9b of the rotating cam 9.

Operations of the reclining device will be described. Meanwhile, it is assumed that the ratchet 7 is provided on a seat back side and the base plate 5 is provided on a seat cushion side.

Generally, due to an urging force of the spiral spring 19, each pawl 10 provided on the base plate 5 is positioned at the locked position where the external tooth 10d is engaged with the internal teeth 7a of the ratchet 7, and as a result, the relative rotation between the ratchet 7 and the base plate 5 is restricted, and thus the seat back 3 becomes a state (locked state), where the seat back 3 cannot be rotated with respect to the seat cushion 2.

When the operation shaft 8 is operated against the urging force of the spiral spring 19 and thus the rotating cam 9 is rotated in the other direction, each pawl 10 is moved to the unlocked position where the external tooth 10d is disengaged from the internal teeth 7a, and as a result, the relative rotation between the ratchet 7 and the base plate 5 is enabled, and thus, the seat back 3 can be rotated with respect to the seat cushion 2.

If the operation force on the rotating cam 9 is released, the external tooth 10d of each pawl 10 provided on the base plate 5 is engaged with the internal teeth 7a of the ratchet 7 due to the urging force of the spiral spring 19, and thus the relative rotation between the ratchet 7 and the base plate 5 is restricted, so that it is to be the locked state again.

CITATION LIST

Patent Literature

Patent Document 1: JP-B-3792942

SUMMARY

Technical Problem

However, according to the reclining device of the above configuration, if a force to make the ratchet 7 and the base plate 15 relatively rotate is exerted on the reclining device 4, the force is transmitted from the surfaces opposite to the surfaces, on which the external teeth 10a are formed, of the pawls 10 through the hook portions 9a to the rotating cam 9. In this time, a large bending moment is caused on the hook portions 9a having a cantilever shape.

Therefore, there is a problem such that a thickness of the hook portions 9a of the rotating cam 9 have to be increased or a high rigidity material has to be used, thereby increasing cost.

The present invention has been made with considering the above problems, and an object of the invention is to provide a low-cost reclining device.

Solution to Problem

In order achieve at least one of the above objects, a reclining device according to one aspect of the present invention includes: a first member, which has a bottomed cylindrical shape and is provide with internal teeth formed thereon along a circumferential direction thereof; a second member, which is stacked at an open side of the first member and provided to be rotatable with respect to the first member in the circumferential direction; a pawl, which is movably provided with the second member and includes an external tooth formed to engage with the internal teeth and a recess formed to extend in a direction intersecting with a radial direction of the relative rotation, on a surface opposite to a surface, on which the external tooth is formed; a rotating cam, which is provided to be rotatable about an axis of the relative rotation and includes a hook portion having a hook shape, wherein when the rotating cam is rotated in one direction, the hook portion applies a force on a surface opposite to the surface on which the external tooth is formed of the pawl, so that the pawl is moved to a locked position where the external tooth is engaged with the internal teeth of the first member, and wherein when the rotating cam is rotated in the other direction, the hook portion enters into the recess of the pawl and presses an inner wall surface of the recess at a side of the rotation center of the relative rotation, so that the pawl is moved to an unlocked position where the external tooth is disengaged from the internal teeth of the first member; a guide, which is formed with the second member and guides the pawl between the locked position and the unlocked position; and a cam, which is provided among the rotating cam, the pawl and the guide and is pressed and contacted against the pawl and the guide when being pressed by the hook portion due to the rotation of the rotating cam in the one direction.

Advantageous Effects of Invention

According to the present invention, since a cam, which is provided among the rotating cam, the pawl and the guide, presses and contacts with the pawl and the guide when being pressed by the hook portion due to the rotation of the rotating cam in the one direction, if a force to make the first member and the second member relatively rotate is exerted on the reclining device, the force is transmitted to the cam from a surface opposite to the surface, on which the external tooth is formed, of the pawl. The force transmitted to the cam is dispersed such that a part thereof is transmitted to the guide and the other is transmitted to the rotating cam via the hook portion. Therefore, a force to be transmitted to the hook portion of the rotating cam is reduced as compared to the conventional case, so that there is no need to increase a thickness of the hook portion of the rotating cam or to use a high rigidity material, thereby achieving cost-down.

Other features and effects of the present invention will be more apparent from the following description of embodiments of the invention and the accompanying drawings.

DESCRIPTION OF EMBODIMENTS

Figure 1:
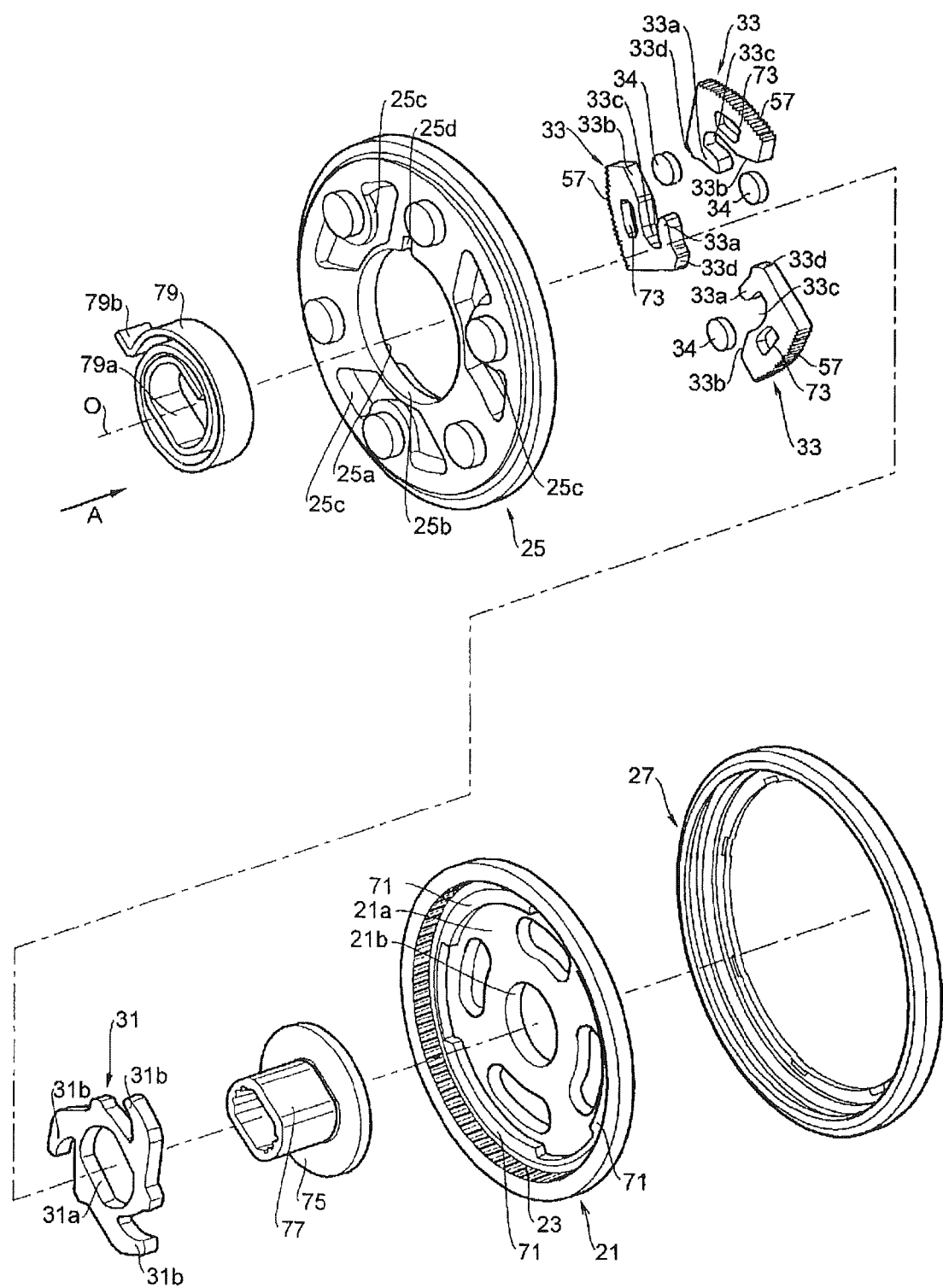
FIG. 1 is an exploded perspective view showing a reclining device according to the present embodiment.
Figure 2:
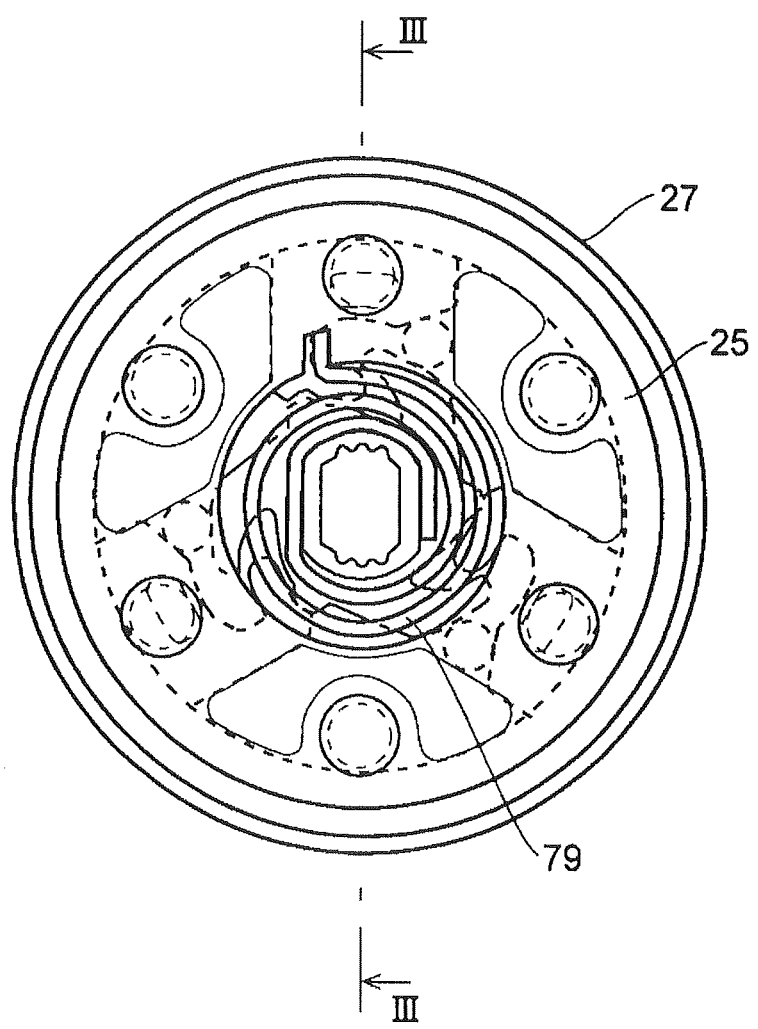
FIG. 2 is a perspective view of a ratchet in FIG. 1 as viewed from a direction of an arrow A.
Figure 3:
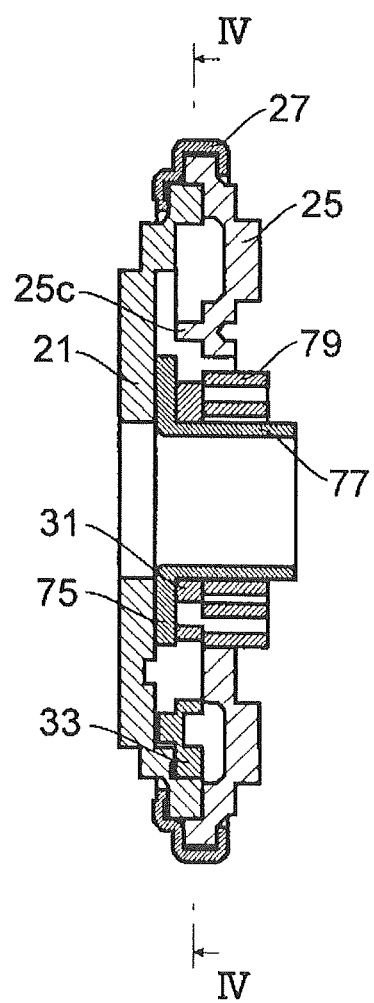
FIG. 3 is a sectional view taken along a section line in FIG. 2.
Figure 4:
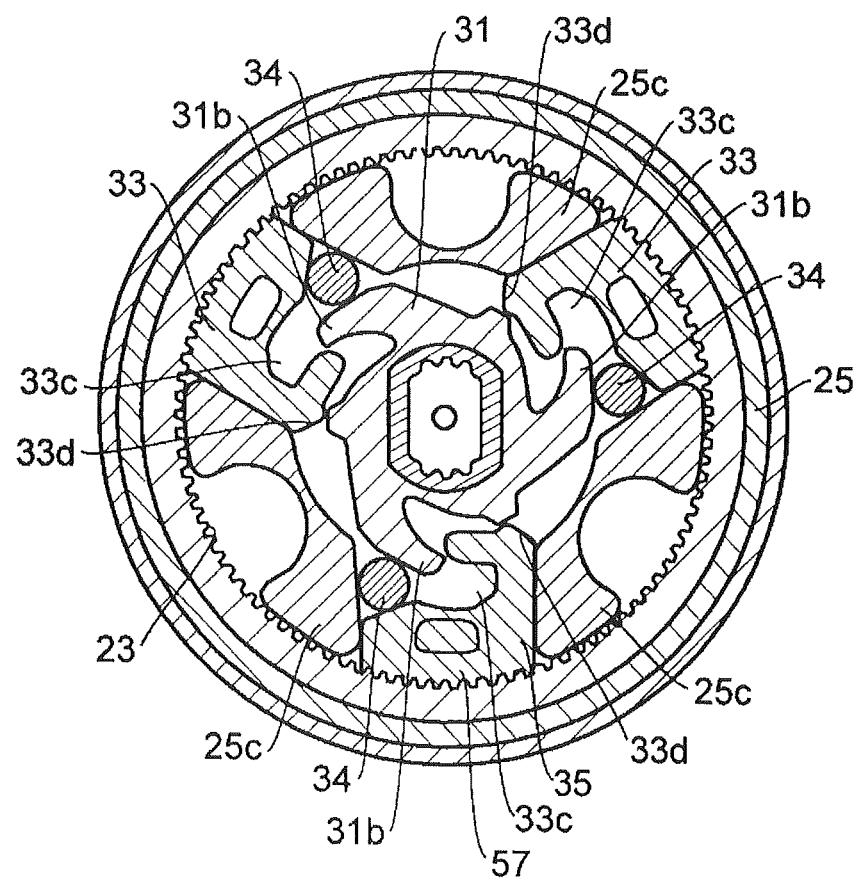
FIG. 4 is a sectional view taken along a section line IV-IV in FIG. 3, explaining a locked state.
Figure 5:
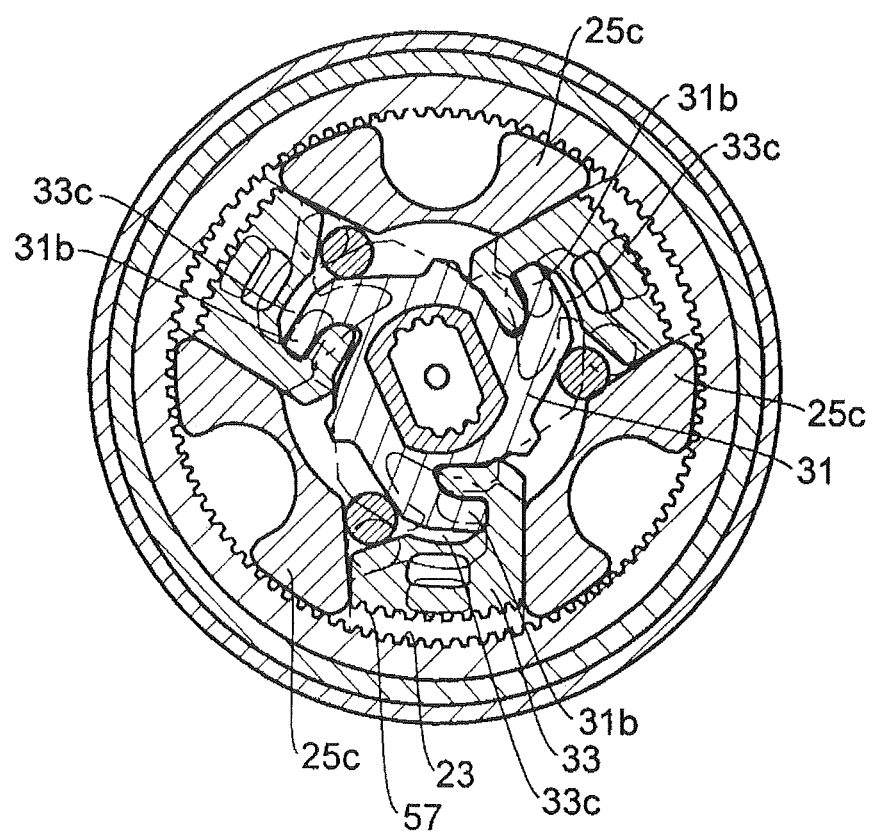
FIG. 5 is a view explaining an unlocked state in FIG. 4.

Next, an embodiment of the present invention will be described with reference to the accompanying drawings. FIG. 1 is an exploded perspective view showing a reclining device according to the present embodiment, FIG. 2 is a perspective view of a ratchet in FIG. 1 as viewed from a direction of an arrow A, FIG. 3 is a sectional view taken along a section line in FIG. 2, FIG. 4 is a sectional view taken along a section line IV-IV in FIG. 3, explaining a locked state, and FIG. 5 is a view explaining an unlocked state in FIG. 4.

Figure 6:
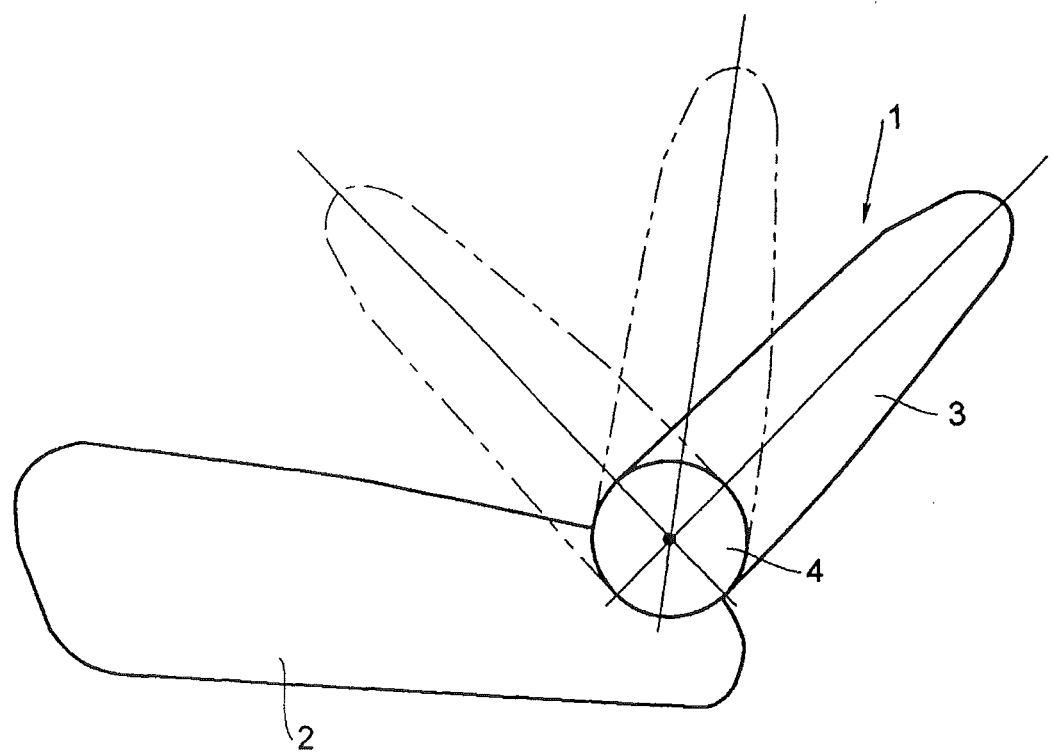
FIG. 6 is a configuration view of a seat.
Figure 7:
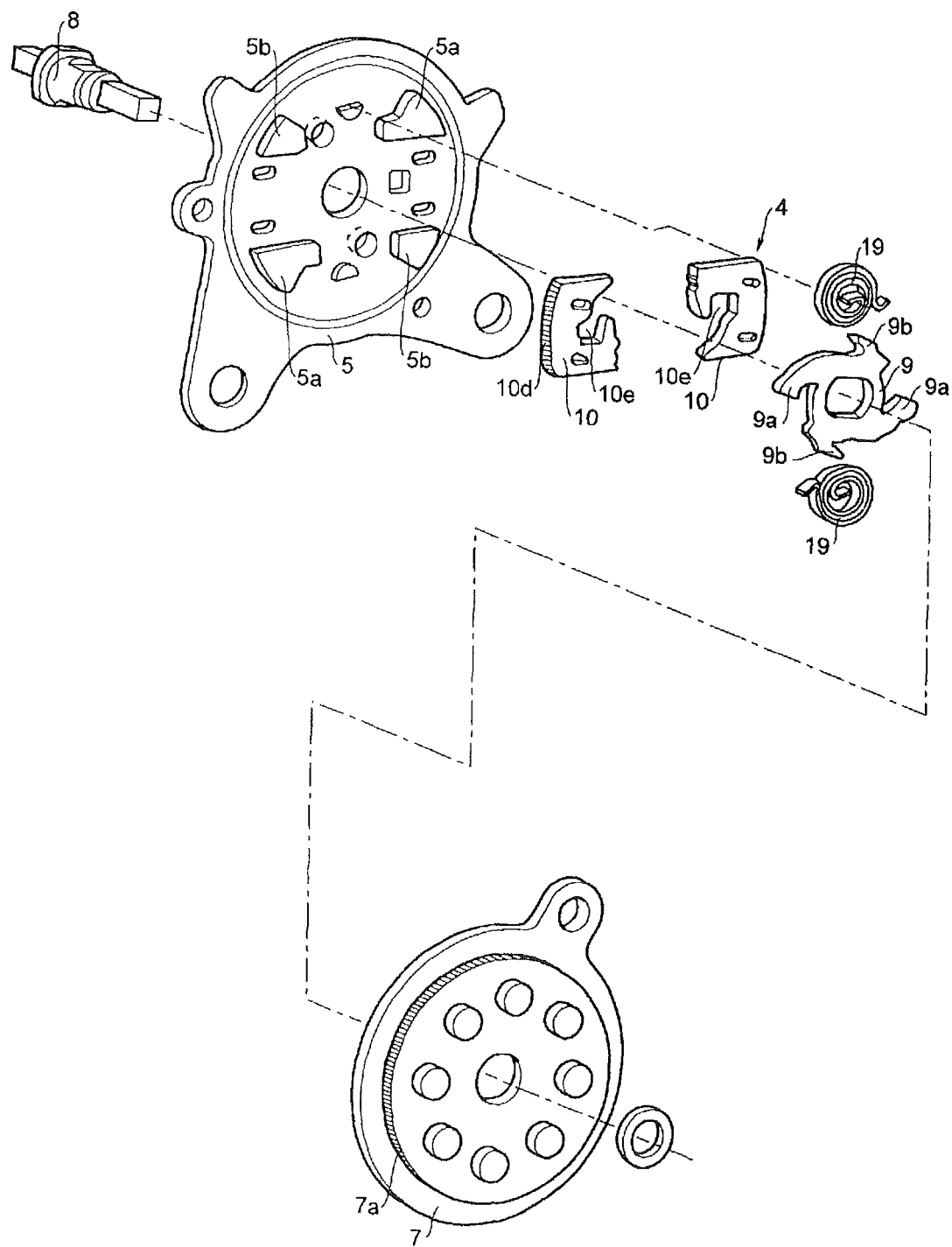
FIG. 7 is an exploded perspective view showing a reclining device for a vehicle seat according to the prior art.
Figure 8:
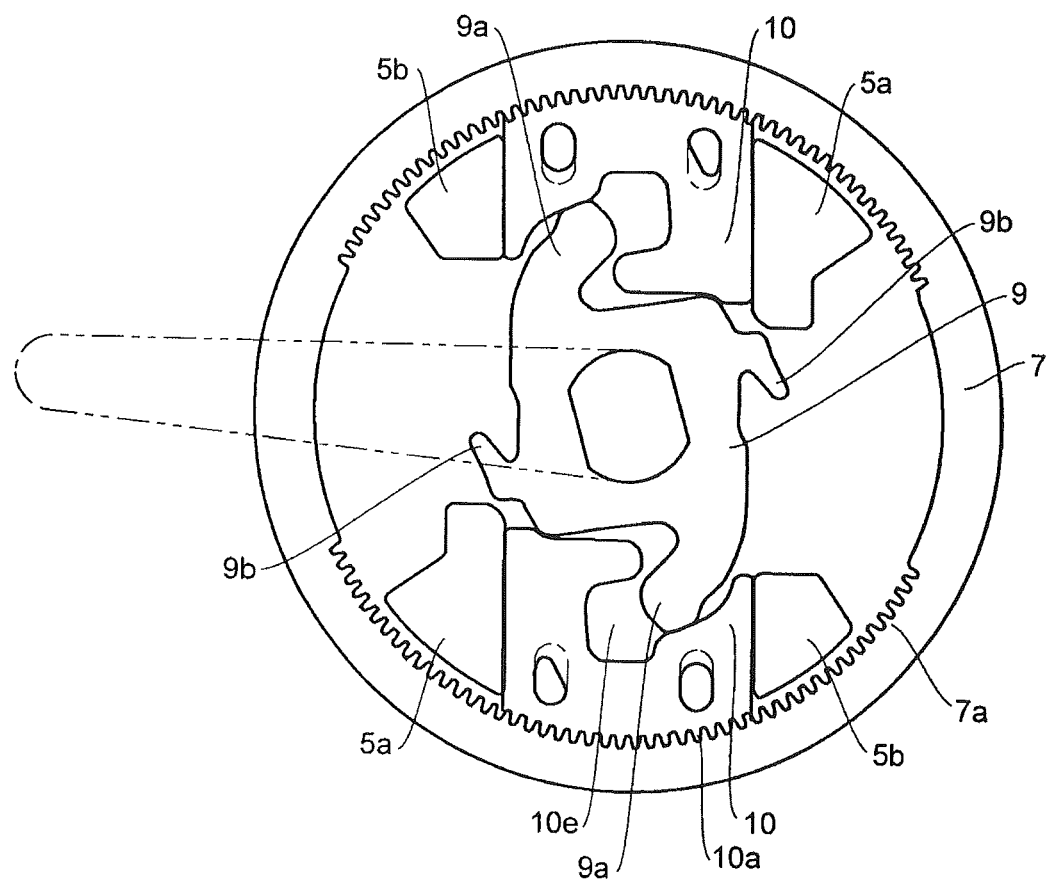
FIG. 8 is a configuration view explaining a locked state of the reclining device in FIG. 7.

Similarly to the reclining device 4 shown in FIG. 6, the reclining device according to the present embodiment is provided on a rotation axis to tilt the seat back 3.

In FIG. 1, a ratchet (first member) 21 provided on a side of the seat back is obtained by half-blanking on a disk-shaped plate material by a press working and has a bottomed cylindrical shape, in which one side is an open side. Internal teeth 23 are formed on an inner cylindrical surface of the ratchet 21 along the circumferential direction overall. Also, a through-hole 21b is formed in the center of a bottom portion 21a.

A base plate (second member) 25 provided on a side of a seat cushion is also obtained by half-blanking on a disk-shaped plate material by a press working and has a bottomed cylindrical shape, one side of which is an open side. A diameter of a bottom portion 25a of the bottomed cylinder is set to be slightly larger than an outer diameter of the ratchet 21. Also, the ratchet 21 is fitted into the bottom portion 25a, and the base plate 25 and the ratchet 21 are able to relatively rotate. Also, a through-hole 25b is formed in the center of the ratchet 21.

Further, as shown in FIG. 3, an outer circumferential portion of the ratchet 21 and an outer circumferential portion of the base plate 25 are clamped by an outer circumferential ring 27 having a ring shape, so that the ratchet 21 and the base plate 25 are held to be able to relatively rotate, without being separated in a direction of a relative rotation axis (a reference numeral O in FIG. 1).

Returning to FIG. 1, a rotating cam 31 is disposed in a space defined by the bottom portion 21a of the ratchet 21 and the bottom portion 25a of the base plate 25. A non-circular (oval) through-hole 31a is formed in the center of the rotating cam 31.

Three pawls 33 are arranged on the base plate 25 to be located outside the rotating cam 31. The pawls 33 have external teeth 57 to be able to engage with the internal teeth 23.

Then, as shown in FIG. 4, the base plate 35 is provided with guides 25c for respectively guiding the pawls 33 in a radial direction of the relative rotation. Therefore, each pawl 10 is movable in the radial direction of the relative rotation.

Also, a circular cam (cam) 34 is disposed among each pawl 33, the rotating cam 31 and each guide 25c.

Returning FIG. 1, a recess 33c extending in a direction intersecting with the radial direction of the relative rotation, and a hook portion 33a are formed on a surface opposite to a surface, on which the external tooth 57 is formed, of each pawl 33.

Meanwhile, three hook portions 31b to be entered into the recess 33c of each pawl 33 are formed on a circumferential portion of the rotating cam 31. Also, a lock surface 33b, to which each circular cam 34 can be contacted, is formed on the surface opposite to the surface, on which the external tooth 57 is formed, of each pawl 33. Further, each pawl 33 has a rotating cam contacting portion 33d formed on the hook portion 33a to be contacted to portions of the rotating cam 31 except for the hook portions 31b when being tilted.

Also, as shown in FIG. 4, if the rotating cam 31 is rotated in one direction (a clockwise direction in the figure), the hook portions 31b of the rotating cam 31 press the circular cams 34, and the circular cams 34 press the guides 25c and the lock surfaces 33b of the pawls 33, so that the pawls 33 are moved in a direction away from the relative rotation axis to be positioned at a locked position, where the external teeth 57 of the pawls 33 are engaged with the internal teeth 23 of the ratchet 21.

Meanwhile, as shown in FIG. 5, if the rotating cam 31 is rotated the other direction (a counter-clockwise direction in the figure) when the pawls 33 are positioned at the locked position, the hook portions 31b of the rotating cam 31 enter into the recesses 33c of the pawls 33 to engage with the hook portions 33a of the pawls 33 (and thus, to press inner wall surfaces of the recesses 33c at a side of the rotation center of the relative rotation), so that the pawls 33 are pulled up in a direction closer to the relative rotation axis to be positioned at an unlocked position, where the external teeth 57 of the pawls 33 are disengaged from the internal teeth 23 of the ratchet 21.

According to the present embodiment, an unlock holding mechanism configured by three arc-shaped guides 71, which is formed along a circumferential direction of an inner cylindrical surface of the ratchet 21 and is located at a side of the bottom portion 21a than the internal teeth 23, and protrusions 73, which is respectively formed on a surface of each pawl 33 opposing to the bottom portion 21a of the ratchet 21 by half-blanking, is provided.

Them, when the protrusion 73 of each pawl 33 is contacted to the respective arc-shaped guide 71, the pawl 33 is held in the unlocked position.

An operation shaft 77, which has a non-circular (oval) sectional shape and rotate integrally with the rotating cam 31, is engaged in the non-circular through-hole 31a of the rotating cam 31. A flange portion 75, which formed on an outer circumferential surface of the operation shaft 77 along the circumferential direction overall, protrudes in the radial direction of the operation shaft 77 and contacts to the bottom portion 21a of the ratchet 21, to restrict the operation shaft 77 from being tilted in any direction with respect to the bottom portion 21a of the ratchet (first member) 21. The flange portion 77 according to the present embodiment is configured as one continuous flange which is formed over the circumferential direction of the outer circumferential surface of the operation shaft 77. However, the flange portion 75 may be configured as a plurality of non-continuous flanges. In this case, to restrict the operation shaft 77 from being tilted in any direction with respect to the bottom portion 21a of the ratchet (first member) 21, it is sufficient that an angle in the circumferential direction of a gap between the adjacent flanges be less than 180 degrees.

Further, the operation shaft 77 is set to have a height exposed from the through-hole 25b of the base plate 25 to the outside.

In addition, a spiral spring 79 formed by working on an elongated spring plate material in a spiral shape is disposed in the through-hole 25b of the base plate 25. An inner end 79a of the spiral spring 79 is locked on the operation shaft 77 and an outer end is locked in a notch 25d, which is formed in a circumferential surface of the through-hole 25b of the base plate 25. Due to an urging force of the spiral spring 79, the pawls 33 are urged in a direction toward the locked position via the rotating cam 31.

Operations of the reclining device according to the present embodiment will be described with reference to FIGS. 4 and 5.

As shown in FIG. 4, when no operation force is exerted on the rotating cam 31, the rotating cam 31 is rotated in one direction (a clockwise direction in the figure) due to the urging force of the spiral spring 79, and thus the hook portions 31b of the rotating cam 31 are pressed against the lock surfaces 33b of the pawls 33 via the circular cams 34, so that the pawls 33 are moved in a direction away from the relative rotation axis to be positioned at the locked position, where the external teeth 57 of the pawls 33 are engaged with the internal teeth 23 of the ratchet 21. As a result, the relative rotation between the ratchet 21 and the base plate 25 is restricted, so that the seat back becomes a state (locked state), where the seat back cannot be rotated with respect to the seat cushion.

Here, when the operation shaft 77 is operated against the urging force of the spiral spring 79 and the rotating cam 31 is rotated in the other direction (a counter-clockwise direction in the figure), the hook portions 31b of the rotating cam 31 enter into the recesses 33c of the pawls 33 and engage with the hook portions 33a of the pawls 33 (and thus, to press the inner wall surfaces of the recesses 33c at a side of the rotation center of the relative rotation), so that the pawls 33 are pulled up in a direction closer to the relative rotation axis to be positioned at the unlocked position, where the external teeth 57 of the pawls 33 are disengaged from the internal teeth 23 of the ratchet 21. As a result, the relative rotation between the ratchet 21 and the base plate 25 is enabled, and thus, the seat back can be rotated with respect to the seat cushion.

If the operation force on the operation shaft 77 is released, the pawls 33, as shown in FIG. 4, returns to the locked position, where the external teeth 57 are engaged with the internal teeth 23 of the ratchet 21, due to the urging force of the spiral spring 79, so that the relative rotation between the ratchet 21 and the base plate 25 is restricted, so that the locked state is again obtained.

Additionally, between an initial stage locked state and a forward inclined state as shown in FIG. 6, the pawls 33 can be held in the unlocked position by the unlock holding mechanism as described above. Even if the operation force on the operation shaft 77 is released, the seat back can be rotated without operating the operation shaft 77. In other words, between the initial stage of the locked state and the forward inclined state as shown in FIG. 6, the protrusion 73 of each pawl 33 is positioned above the arc-shaped guide 71, so that the pawls 33 can be held in the unlocked position even if the operation force on the operation shaft 77 is released, thereby allowing the relative rotation between the ratchet 21 and the base plate 25.

According to the reclining device of the above configuration, the following effects can be achieved.

(1) Since the circular cams 4, which are provided among the rotating cam 31, the pawls 33, and the guides 25c, press and contact with the pawls 33 and the guides 25c when being pressed by the hook portions 31b due to the rotation of the rotating cam 31 in one direction, if a force to make the ratchet 21 and the base plate 25 relatively rotate is exerted on the reclining device, the force is transmitted to the circular cams 34 from the lock surfaces 33b that are surfaces opposite to the surfaces, on which the external teeth 57 are formed, of the pawls 33. The force transmitted to the circular cams 34 is dispersed such that a part thereof is transmitted to the guides 25c and the other is transmitted to the rotating cam 31 via the hook portions 31b. Therefore, a force to be transmitted to the hook portions 31b of the rotating cam 31 is reduced as compared to the conventional case, so that there is no need to increase a thickness of the hook portions 31b of the rotating cam 31 or to use a high rigidity material, thereby achieving cost-down.

(2) Since the pawls 33 have the cam contacting portions 33d formed thereon to be contacted to portions of the rotating cam 31 except for the hook portions 31b when the pawls 33 are tilted, if the force to make rotating the ratchet 21 and the base plate 25 relatively rotate is exerted on the reclining device so that the pawls 33 are tilted, the cam contacting portions 33d contact with the rotating cam 31, and the force is further dispersed. Therefore, the force to be transmitted to the hook portions 31b of the rotating cam 31 is not increased, so that there is no need to increase a thickness of the hook portions 31b of the rotating cam 31 or to use a high rigidity material, thereby achieving cost-down.

The present invention is not limited to the above embodiment. Various modifications can be made within the spirit of the present invention and the scope as defined by the appending claims. For example, although the ratchet 21 is provided on a side of the seat back and the base plate 25 is provided on the seat cushion in the above embodiment, conversely, the base plate 25 may be provided on a side of the seat back and the ratchet 21 may be provided on the seat cushion.

REFERENCE SIGNS LIST

21 Ratchet
23 Internal teeth
25 Base plate
31 Rotating cam
31 Hook portion
33 Pawl
33*d* Cam contacting portion
33*c* Recess
34 Circular cam
57 External tooth

The invention claimed is:

1. A reclining device, comprising:
a first member, which has a bottomed cylindrical shape and is provide with internal teeth formed thereon along a circumferential direction thereof;
a second member, which is stacked at an open side of the first member and provided to be rotatable with respect to the first member in the circumferential direction;
a pawl, which is movably provided with the second member and includes an external tooth formed to engage with the internal teeth and a recess formed to extend in a direction intersecting with a radial direction of a relative rotation, on a surface opposite to a surface on which the external tooth is formed, the recess of the pawl comprising a first surface facing the surface on which the external tooth is formed and a second surface facing away from the surface on which the external tooth is formed;
a rotating cam, which is provided to be rotatable about an axis of the relative rotation and includes a hook portion having a hook shape,
wherein, when the rotating cam is rotated in one direction, the hook portion applies a force on the surface opposite to the surface on which the external tooth is formed of the pawl, so that the pawl is moved to a locked position where the external tooth is engaged with the internal teeth of the first member, and
wherein, when the rotating cam is rotated in another direction, the hook portion enters into the recess of the pawl and presses the first surface of the recess at a side of a rotation center of the relative rotation, so that the pawl is moved to an unlocked position where the external tooth is disengaged from the internal teeth of the first member;
a guide, which is formed with the second member and guides the pawl between the locked position and the unlocked position; and
a cam, which is provided among the rotating cam, the pawl, and the guide, and which presses and contacts with the pawl and the guide when being pressed by the hook portion due to a rotation of the rotating cam in the one direction.

2. The reclining device according to claim 1, wherein the pawl includes a cam contacting portion formed to contact with a portion of the rotating cam except for the hook portion when the pawl is tilted.

\* \* \* \* \*